US009139247B2

(12) United States Patent
Matsuoka

(10) Patent No.: US 9,139,247 B2
(45) Date of Patent: Sep. 22, 2015

(54) FRONT STRUCTURE FOR SADDLE-RIDE TYPE VEHICLE, AND VEHICLE INCLUDING SAME

(71) Applicant: HONDA MOTOR CO., LTD., Minato-Ku, Tokyo (JP)

(72) Inventor: Yosuke Matsuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/323,542

(22) Filed: Jul. 3, 2014

(65) Prior Publication Data

US 2015/0015019 A1    Jan. 15, 2015

(30) Foreign Application Priority Data

Jul. 10, 2013   (JP) ................................. 2013-144514

(51) Int. Cl.
| B62J 17/04 | (2006.01) |
| B62J 17/00 | (2006.01) |
| B62J 17/02 | (2006.01) |
| B62J 99/00 | (2009.01) |

(52) U.S. Cl.
CPC *B62J 17/00* (2013.01); *B62J 17/02* (2013.01); *B62J 17/04* (2013.01); *B62J 2099/0033* (2013.01)

(58) Field of Classification Search
CPC ..... B62J 17/04; B62J 17/02; B62J 2099/0033
USPC ....................................................... 296/78.1
See application file for complete search history.

(56) References Cited

U.S. PATENT DOCUMENTS

| 2002/0167191 A1* | 11/2002 | Tsukui et al. ................ 296/78.1 |
| 2009/0189413 A1* | 7/2009 | Misaki et al. .............. 296/180.1 |
| 2012/0104787 A1* | 5/2012 | Tsukui et al. ................ 296/78.1 |
| 2014/0159426 A1* | 6/2014 | Takahashi et al. ............ 296/192 |

FOREIGN PATENT DOCUMENTS

| DE | 102008005933 A1 * | 8/2008 |
| EP | 2 033 885 A1 | 3/2009 |
| EP | 2 481 657 A2 | 8/2012 |
| EP | 2 489 581 A1 | 8/2012 |
| JP | 2007-091126 A | 4/2007 |
| JP | 2012-171438 A | 9/2012 |

OTHER PUBLICATIONS

Machine Tranlation of DE102008005933A1, printed from the EPO website, Apr. 15, 2015.*

* cited by examiner

*Primary Examiner* — Jason S Morrow
(74) *Attorney, Agent, or Firm* — Carrier Blackman & Associates, P.C.; William D. Blackman; Joseph P. Carrier

(57) ABSTRACT

A front structure for a saddle-ride vehicle includes a transparent windscreen. The windscreen covers a front side of at least one gauge. The gauge is arranged in front of a handlebar for the vehicle. A front cowl that is arranged outside of a front fork in a vehicle width direction and extends in a straddling manner in front of and behind the front fork in a side view. The front cowl is arranged below a supporting member for the handlebar, and the front cowl is spaced away from the windscreen in a vertical direction.

14 Claims, 12 Drawing Sheets

FRONT STRUCTURE FOR SADDLE-RIDE TYPE VEHICLE, AND VEHICLE INCLUDING SAME

CROSS-REFERENCE TO RELATED APPLICATIONS

The present invention claims priority under 35 USC 119 based on Japanese patent applications No. 2013-144514, filed on Jul. 10, 2013. The entire disclosure of this priority document, including the specification, claims and drawings, is incorporated by reference herein.

BACKGROUND OF THE INVENTION

1. Field of the Invention

The present invention relates to a front structure for a saddle-ride type vehicle including a windscreen and a front cowl, and also relates to a vehicle including such front structure.

2. Description of the Background Art

There has been known the existing vehicle body front structure configured such that a windscreen is arranged in front of a handlebar and a clearance is formed between the windscreen and a front cowl. As an example, see JP-A No. 2012-171438.

However, an off-road vehicle often travels while a rider looks at a road surface just in front of a front wheel. If an opaque front cowl of a large size is used, forward visibility is poor.

The present invention has been accomplished in view of the above-mentioned circumstances, and an object of the present invention is to provide a front structure for a saddle-ride type vehicle configured such that a rider can easily look at a road surface just in front of the front wheel.

SUMMARY OF THE INVENTION

In order to achieve the above objects, the present invention according to a first aspect thereof provides a front structure for a saddle-ride vehicle, which includes a transparent windscreen that covers a front side of at least one gauge. The at least one gauge is arranged in front of a handlebar. The vehicle further includes a front cowl that is arranged outside of a front fork in a vehicle width direction. The front cowl extends in a straddling manner in front of and behind the front fork as seen from a side view. The front cowl is arranged below a supporting member for the handlebar, and the front cowl is spaced away from the windscreen in a vertical direction.

According to a second aspect of the present invention, in addition to the first aspect, the front cowl is arranged below a straight line connecting one of a left and right grip of the handlebar, and an upper surface of a front fender in side view, when the handlebar is in a position for the vehicle to move straight ahead.

According to a third aspect of the present invention, in addition to the first aspect, the windscreen is configured such that a vertical center of the windscreen is formed at a substantially same height as a height of the handlebar, and an outermost end of the windscreen is located vertically at a position corresponding to the vertical center of the windscreen.

According to a fourth aspect of the present invention, in addition to the second aspect, the windscreen is configured such that a vertical center of the windscreen is formed at a substantially same height as a height of the handlebar, and an outermost end of the windscreen is located vertically at a position corresponding to the vertical center of the windscreen.

According to a fifth aspect of the present invention, in addition to the first aspect, the outermost end of the windscreen corresponds to a backmost end of the windscreen, and a connection for a main harness is arranged above the front cowl and behind the backmost end of the windscreen.

According to a sixth aspect of the present invention, in addition to the fourth aspect, the outermost end of the windscreen corresponds to a backmost end of the windscreen, and a connection for a main harness is arranged above the front cowl and behind the backmost end of the windscreen.

According to a seventh aspect of the present invention, in addition to the first aspect, a front portion of a head pipe composing a body frame detachably supports a stay. The stay detachably supports a plurality of electric components. A harness for all of the electric components supported by the stay is coupled to a main harness.

According to an eighth aspect of the present invention, in addition to the sixth aspect, a front portion of a head pipe composing a body frame detachably supports a stay. The stay detachably supports a plurality of electric components. A harness for all of the electric components supported by the stay is coupled to a main harness.

According to a ninth aspect of the present invention, in addition to the seventh aspect, the cowl is connected to and supported by the stay at a position in front of the front fork.

According to a tenth aspect of the present invention, in addition to the eighth aspect, the cowl is connected to and supported by the stay at a position in front of the front fork.

According to an eleventh aspect, the present invention provides a saddle-ride vehicle including a vehicle frame having a head pipe at a front end, and a front fork for supporting a front wheel. The front fork is steerably supported by the head pipe. The saddle-ride vehicle further includes a steering handlebar fixed to an upper end of the front fork, a stay projecting forward from a front portion of the head pipe, and at least one gauge supported by the stay.

The saddle-ride vehicle further includes a front structure. The front structure includes a transparent windscreen that covers a front side of the at least one gauge. The at least one gauge is arranged in front of the handlebar. The front structure further includes a front cowl that is arranged outside of the front fork in a straddling manner in front of and behind the front fork. The front cowl is spaced away from the windscreen in a vertical direction.

According to a twelfth aspect, in addition to the eleventh aspect, the saddle-ride vehicle further includes a front fender suspended from the front forks. In addition, the handlebar includes a left and right grip. The front cowl is arranged below a straight line connecting one of the left grip and the right grip, and an upper surface of the font fender in a side view, when the handlebar is in a position for the vehicle to move straight ahead.

According to a thirteenth aspect, in addition to the eleventh aspect, the windscreen is configured such that a vertical center of the windscreen is formed at a substantially same height as a height of the handlebar, and an outermost end of the windscreen is located vertically at a position corresponding to the vertical center of the windscreen.

According to a fourteenth aspect, in addition to the eleventh aspect, the outermost end of the windscreen corresponds to a backmost end of the windscreen, and a connection for a main harness is arranged above the front cowl and behind the backmost end of the windscreen.

According to a fifteenth aspect, in addition to an eleventh aspect, the front portion of the head pipe detachably supports the stay. The stay supports a plurality of electric components. A harness for the plurality of electric components supported by the stay is coupled to a main harness.

According to a sixteenth aspect, in addition to the eleventh aspect, the cowl is connected to and supported by the stay at a position in front of the front fork.

Advantageous Effects of Invention

In the present invention, since the front cowl is arranged below the supporting member for the handlebar and is separated from the screen in the vertical direction, a clearance can be formed between the screen and the front cowl that are arranged in positions separated from the handlebar. For this reason, the rider can easily look at the road surface just before the front wheel through the clearance while improving maintainability of the gauges. Since the front cowl is small, maintainability from a lateral side of a vehicle body is excellent.

Also, the front cowl is arranged below the straight line connecting the grip of the handlebar and the upper surface of the front fender in the side view. For this reason, visibility of the rider with respect to the road surface just before the front wheel can be improved.

Also, since the screen is configured such that the center thereof in the height direction is formed at substantially the same height as the height of the handlebar and the outermost end is arranged in the center in the height direction, a center position of the screen in the height direction is expanded toward the outside to form the outermost end. For this reason, it becomes possible to shield a rider's hands gripping the handlebar from the traveling wind.

Also, since the outermost end of the screen is matched with the backmost end of the screen and the connection for the main harness is arranged above the front cowl and behind the backmost end of the screen, the connection for the main harness can be arranged in an area unobstructed by the windscreen and front cowl, and connecting work to the connection can be improved.

Also, the stay is detachably supported by the front portion of the head pipe composing the vehicle body frame, the plurality of electric components is supported by the stay, and the harness for all the electric components supported by the stay is coupled to the main harness. For this reason, by removing one connection terminal of the main harness, wiring of all the electric components supported by the stay can be removed, and working efficiency when the stay is removed from the vehicle body frame can be improved.

Also, the stay in front of the front fork supports the front cowl. For this reason, deflection and vibration of the front cowl not coupled to the windscreen can be suppressed.

DETAILED DESCRIPTION OF ILLUSTRATIVE EMBODIMENTS

Hereinafter, an illustrative embodiment of the present invention will now be described in detail, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, in drawings and the illustrated embodiments, "UP", "DOWN", "FRONT", "REAR", "LEFT", and "RIGHT", respectively represent a direction viewed from the perspective of a rider of the motorcycle, seated on the seat and facing forward. Also, in each drawing, a reference sign FR is indicative of a front side of the vehicle body, a reference sign UP is indicative of an upper side of the vehicle body, and a reference sign LE is indicative of a left side of the vehicle body.

First Embodiment

Figure 1:
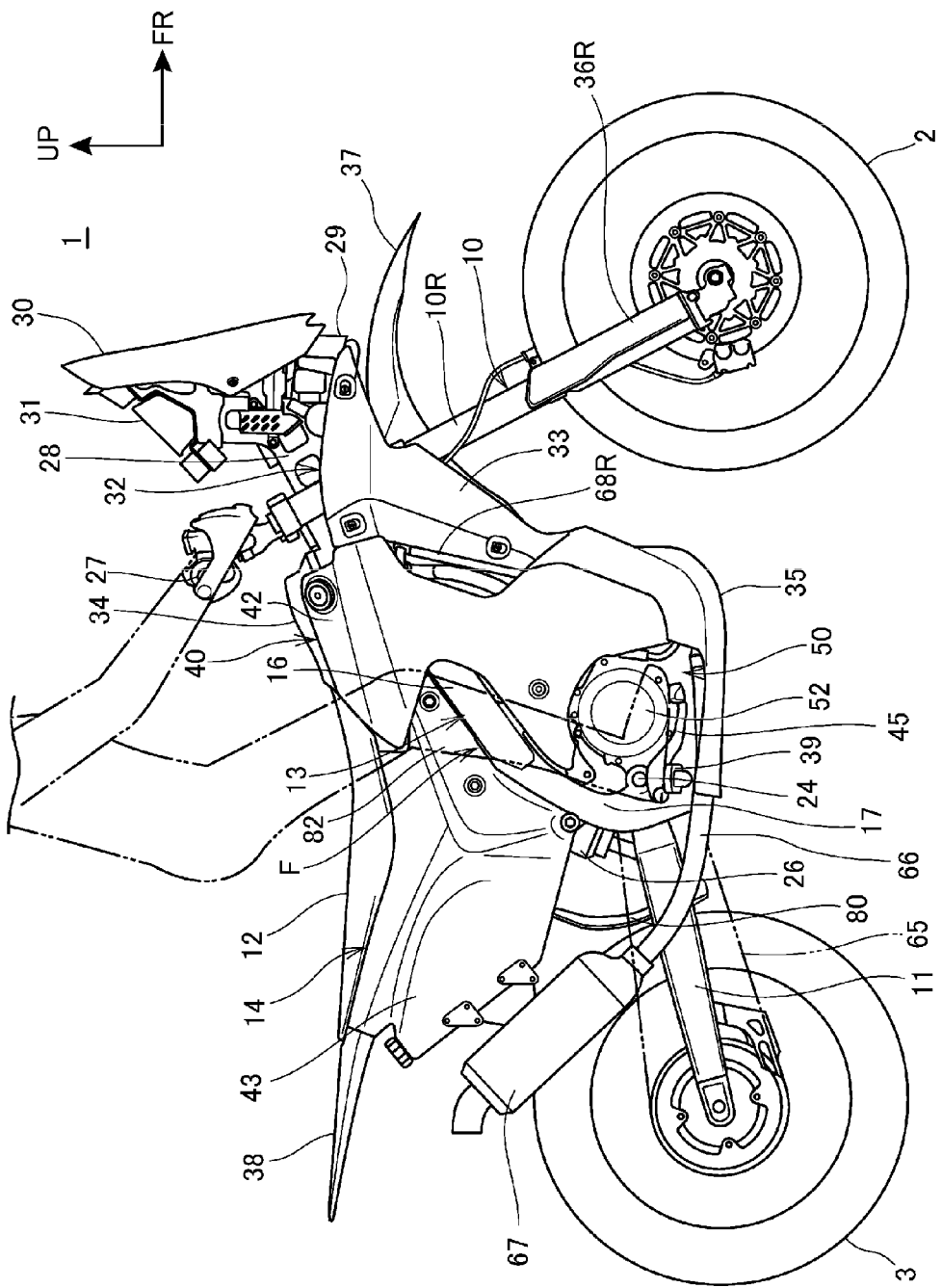
FIG. 1 is a right side view of a motorcycle according to an illustrative embodiment of the present invention.
Figure 2:
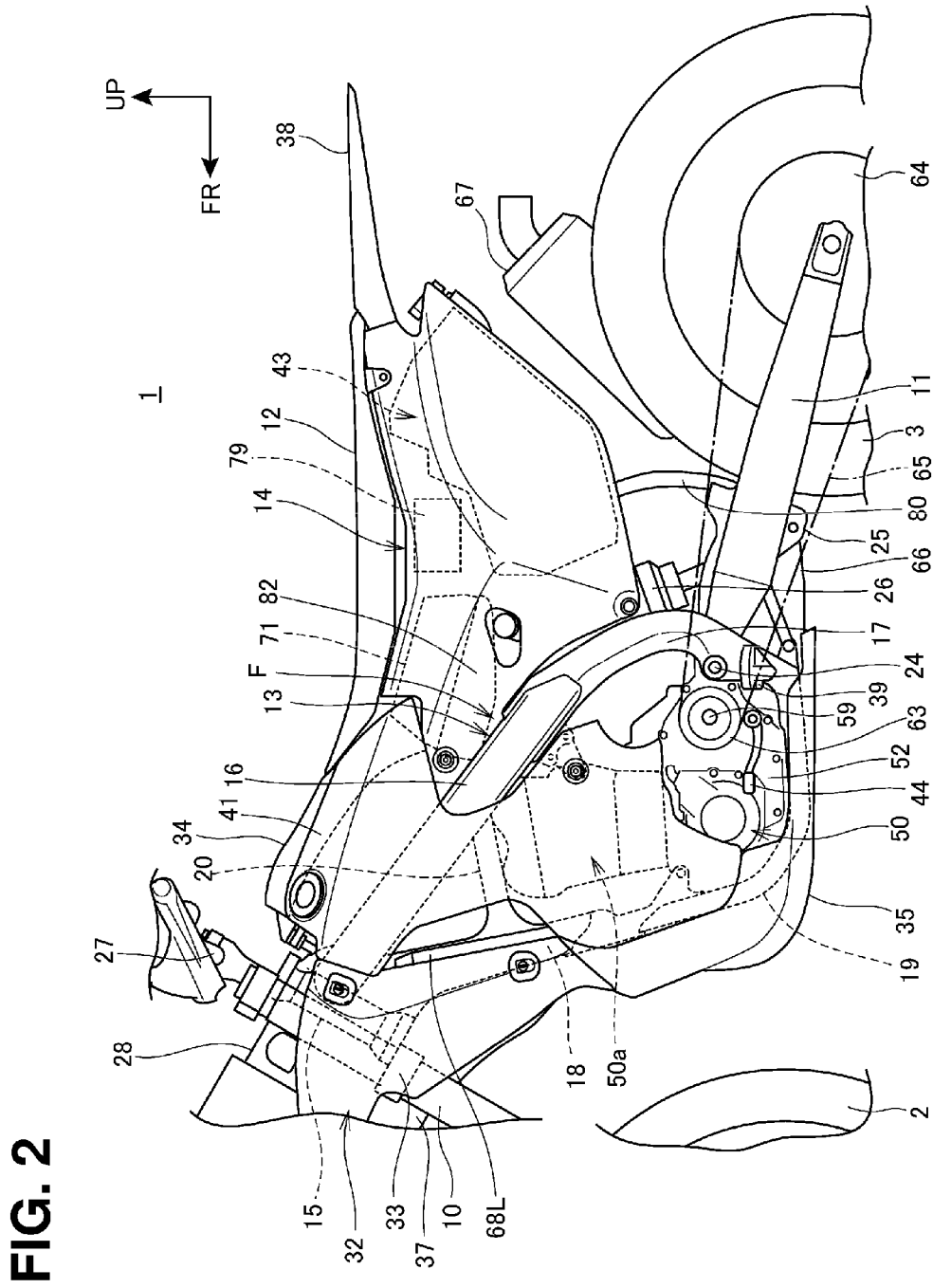
FIG. 2 is a left side view of the motorcycle of FIG. 1.

FIG. 1 is a right side view of a motorcycle 1 according to an illustrative embodiment of the present invention. FIG. 2 is a left side view of the motorcycle 1.

The motorcycle 1 is a vehicle configured such that an engine 50 as a power unit is supported on a vehicle body frame F, a front fork 10 for supporting a front wheel 2 is steerably supported at a front end of the vehicle body frame F, and a swing arm 11 for supporting a rear wheel 3 is provided in a rear portion of the vehicle body frame F.

Also, the motorcycle 1 is a saddle-ride type vehicle configured such that a seat 12 on which an occupant is seated in a straddling manner is provided above the longitudinal center of the vehicle body frame F. Further, the motorcycle 1 is an off-road type vehicle suitable for traveling on an uneven terrain such as sand, has a large suspension stroke, and includes a large-size fuel tank 40.

Figure 3:
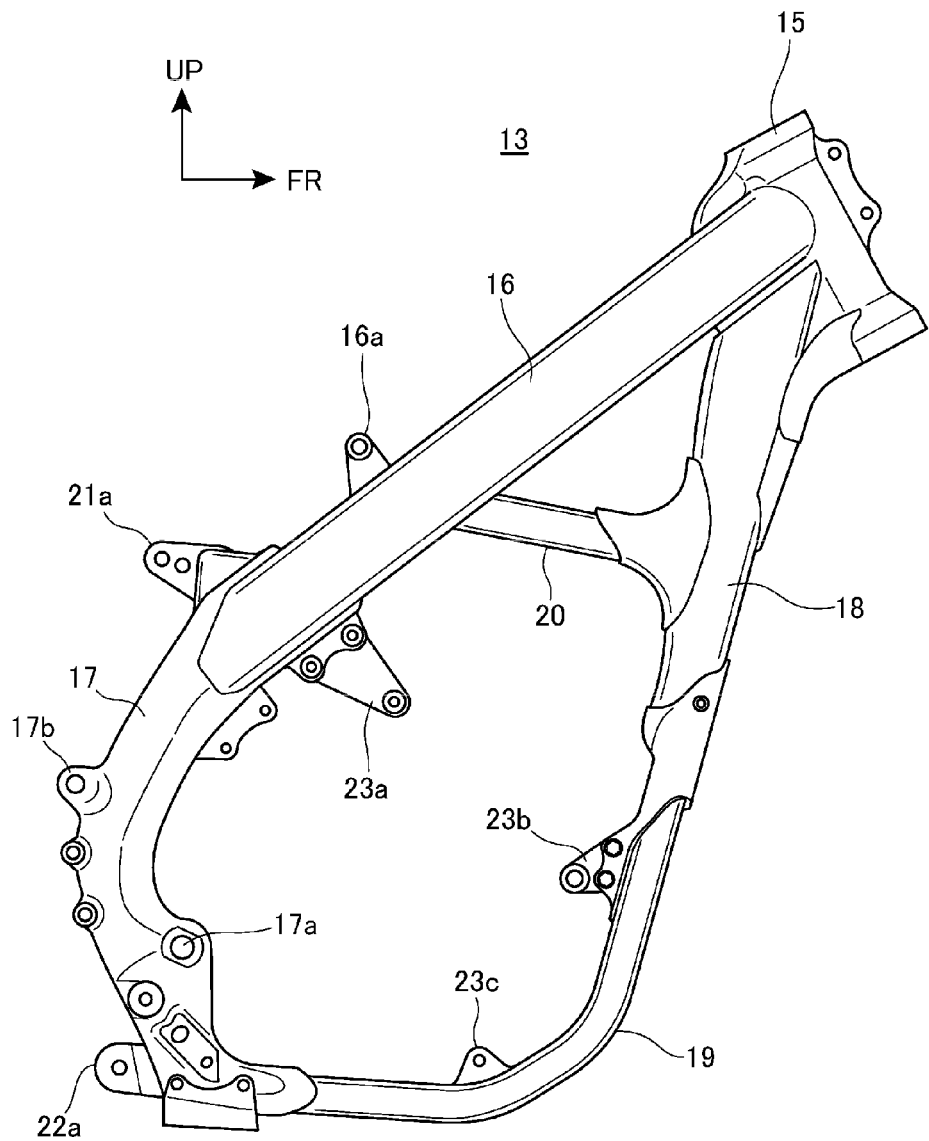
FIG. 3 is a right side view of a vehicle body frame, which is a component of the motorcycle of FIG. 1.
Figure 4:
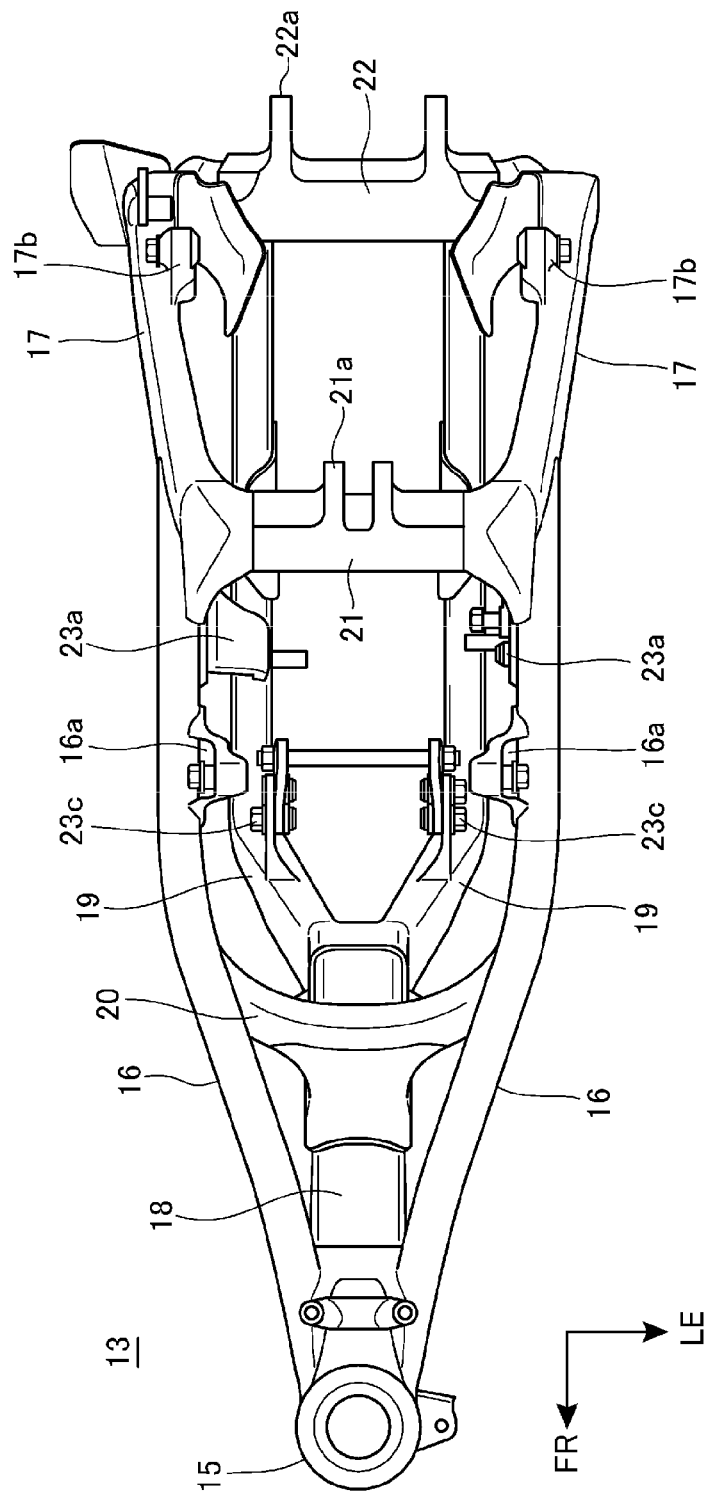
FIG. 4 is a plan view of the vehicle body frame of FIG. 3.

FIG. 3 is a right side view of the vehicle body frame F. FIG. 4 is a plan view of the vehicle body frame F.

As shown in FIGS. 1-4, the vehicle body frame F is composed of a basket-shaped front frame 13 formed by connecting a pipe member and a plate member by welding or the like, and a resin rear frame 14 coupled to a rear portion of the front frame 13.

The front frame 13 is provided with a head pipe 15 that is provided at a front end, a pair of right and left main frames 16, 16 that extend while being inclined obliquely downward to a rear side from the head pipe 15, and a pair of right and left pivot frames 17, 17 that extend downward from rear ends of the respective main frames 16. Also, the front frame 13 is provided with a down frame 18 that extends downward to the rear from a rear surface of a lower portion of the head pipe 15, and under frames 19, 19 that are branched in a horizontal direction from the down frame 18, that extend downward, that are subsequently curved substantially horizontally to the rear side, and that are coupled to lower ends of the pivot frames 17, 17.

Also, the front frame 13 is provided with a reinforcing frame 20 for coupling an upper portion of the down frame 18 to longitudinally intermediate portions of the main frames 16, 16. Further, the front frame 13 is provided with an upper cross member 21 for coupling upper portions of the right and left pivot frames 17, 17 to each other in a vehicle width direction, and a lower cross member 22 for coupling lower portions of the pivot frames 17, 17 to each other in the vehicle width direction.

The rear portions of the main frames 16, 16, the upper portions of the under frames 19, 19, and front ends of horizontal portions of the under frames 19, 19 are provided with engine stays 23a, 23b, 23c by which the engine 50 is fixed.

Lower portions of the pivot frames 17, 17 are respectively formed with pivot holes 17a for supporting a pivot shaft 24 of the swing arm 11. The swing arm 11 has a front end swingably attached to the pivot shaft 24, and a rear wheel 3 is rotatably attached to a rear end of the swing arm 11.

The upper cross member 21 is provided with a suspension coupling stay 21a projecting rearward. The lower cross member 22 is provided with a link coupling stay 22a projecting rearward, and a link mechanism 25 coupled to the swing arm 11 is coupled to the link coupling stay 22a. A cylindrical rear suspension unit 26 has an upper end coupled to the suspension coupling stay 21a and a lower end coupled to the link mechanism 25, and is arranged to be inclined forward.

Upper surfaces of rear portions of the main frames 16, 16 are respectively provided with upper frame stays 16a projecting upward.

Rear surfaces of vertically intermediate portions of the pivot frames 17, 17 are respectively formed with lower frame stays 17b projecting rearward.

The front fork 10 is rotatably attached to the head pipe 15 through a steering shaft (not shown), and the front wheel 2 is rotatably attached to a lower end of the front fork 10. A steering handlebar 27 is fixed to an upper end of the front fork 10.

A front stay 28 projecting forward is fixed to a front portion of the head pipe 15, and a headlight 29, a plate-like windscreen 30 and gauges 31 are supported by the front stay 28.

The fuel tank 40 is provided with a pair of left and right front tanks 41, 42 that are dividedly provided on a left side and a right side of the respective main frames 16, 16, and a rear tank 43 that is provided in the rear frame 14.

The seat 12 is continuous with rear portions of the front tanks 41, 42, extends rearward, and is supported by an upper portion of the rear frame 14.

The motorcycle 1 includes a resin vehicle body cover 32. The vehicle body cover 32 is provided with a pair of right and left cowls 33, 33 that cover the upper portion of the front fork 10 and the down frame 18 from a lateral side, a tank cover 34 that covers the front tanks 41, 42 from above, an under cover 35 that covers the under frame 19 and a crankcase 52 of the engine 50 from a front side and from below, and a pair of left and right fork covers 36L, 36R (only the right fork cover 36R is shown) that cover the lower portion of the front fork 10.

A front fender 37 for covering the front wheel 2 from above is fixed to the front fork 10. A rear fender 38 for covering the rear wheel 3 from above is fixed on the rear frame 14 behind the seat 12.

Lower ends of the pivot frames 17 are provided with a pair of right and left steps 39, 39 for placing the feet of an occupant. A shift pedal 44 is provided in front of the left step 39, and a brake pedal 45 is provided in front of the right step 39.

Figure 5:
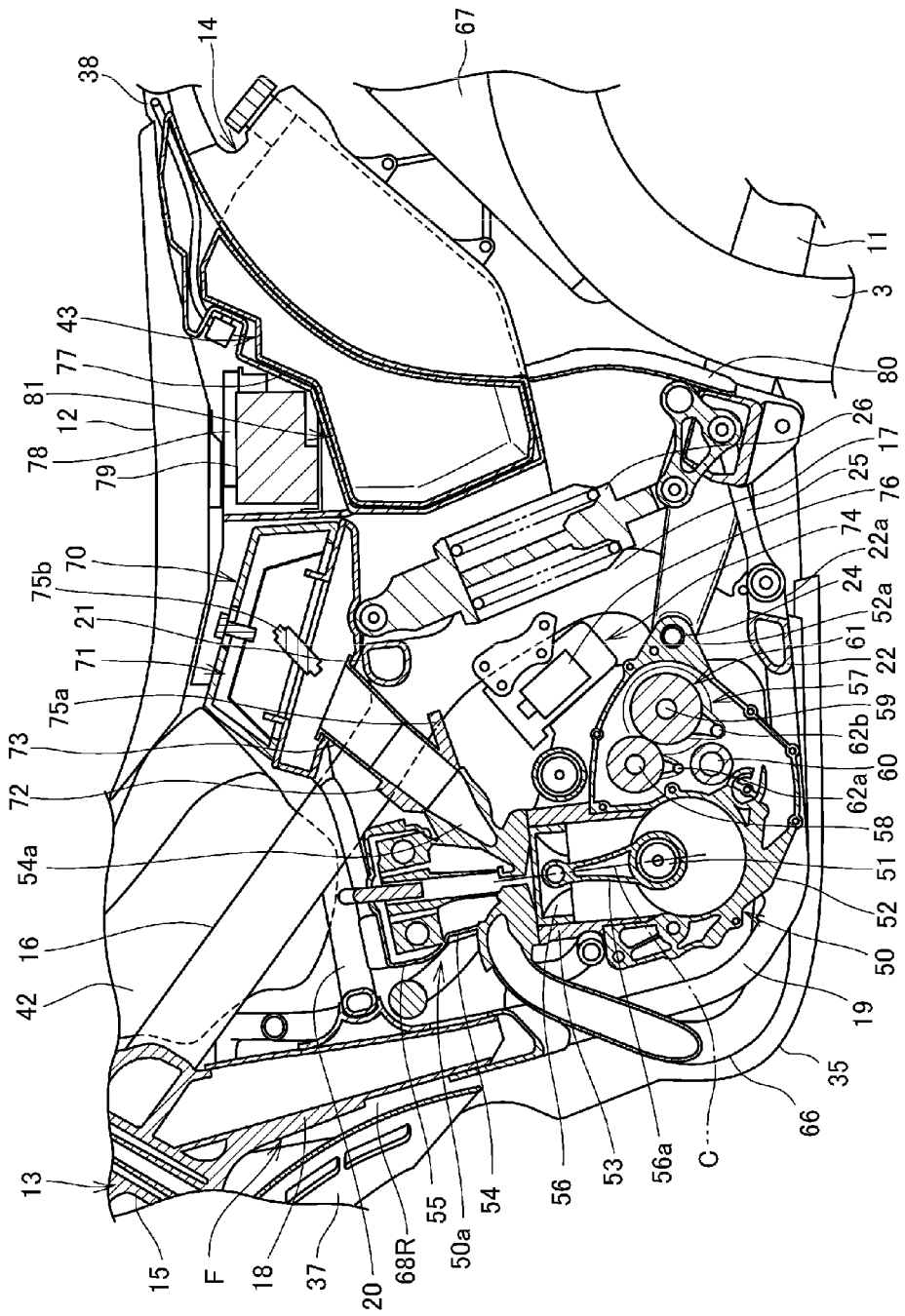
FIG. 5 is a cross-sectional view of peripheral construction of an engine.

FIG. 5 is a cross-sectional view of peripheral construction of the engine 50.

As shown in FIGS. 1, 2 and 5, the engine 50 is a water-cooled single cylinder four-cycle engine, and is supported in the basket-shaped front frame 13. A crankshaft 51 of the engine 50 is arranged to extend horizontally in the vehicle width direction. The engine 50 includes a crankcase 52, and a cylinder portion 50a that projects upward from an upper surface of a front portion of the crankcase 52. The cylinder portion 50a has a cylinder 53, a cylinder head 54 coupled to an upper surface of the cylinder 53, and a head cover 55 covering a valve chamber for the cylinder head 54. The engine 50 is configured such that a cylinder shaft C is arranged to be slightly inclined forward in comparison with a vertical orientation and a piston 56 coupled to the crankshaft 51 through a connecting rod 56a is provided in the cylinder 53.

An upper portion of the head cover 55 overlaps with a lower edge of a reinforcing frame 20 in the side view.

In addition to the engine stays 23a, 23b, and 23c, the engine 50 is also supported on the front frame 13 by inserting the pivot shaft 24 into a fixing portion 52a at the rear of the crankcase 52.

A transmission 57 is incorporated in the rear portion of the engine 50. The transmission 57 is provided with an input shaft 58 driven by the crankshaft 51, an output shaft 59 arranged in parallel with the input shaft 58, and a shift drum 60 rotated by shift operation of the shift pedal 44. The input shaft 58 and the output shaft 59 are provided with a constant mesh gear train 61, and the gear train 61 is switched by shift forks 62a, 62b interlocked to the shift drum 60. Thereby, shift transmission is performed.

The output shaft 59 projects to the left from the rear portion of the crankcase 52, and a drive sprocket 63 (FIG. 2) is fixed to a shaft end of the output shaft 59. Output of the engine 50 is transmitted to the rear wheel 3 through a drive chain 65 laid between the drive sprocket 63 and a driven sprocket 64 of the rear wheel 3. The drive sprocket 63 is covered with a sprocket cover (not shown).

An exhaust pipe 66 of the engine 50 extends in a front downward direction from a front surface of the cylinder head 54, subsequently extends to the right, extends rearward along the under frame 19, and is connected to a muffler 67 arranged to the right of the rear wheel 3. The muffler 67 is supported on the rear frame 14.

A pair of plate-like radiators 68L, 68R with circulating cooling water for the engine 50 are provided between the down frame 18 and the right and left cowls 33, 33.

The front tanks 41, 42 extend between the cowls 33, 33 and the rear frame 14, and have a height extending downward from outer sides of the main frames 16, 16, covering the cylinder portion 50a and the lateral side of the front portion of the crankcase 52.

An intake device 70 for the engine 50 is installed below the seat 12 and behind the cylinder head 54. The intake device 70 has an air cleaner 71 and takes in outside air through the air cleaner 71, a throttle body 72 connected to an intake port 54a of the cylinder head 54, and a connecting tube 73 connecting the throttle body 72 and the air cleaner 71.

The air cleaner 71 is provided to be continuous with the rear sides of the front tanks 41, 42, and also is positioned above the rear suspension unit 26. In the embodiment, the air cleaner 71, the connecting tube 73, and the throttle body 72 are arranged linearly in the front downward direction on a side of the engine 50. For this reason, intake resistance is reduced, and intake efficiency is improved.

A fuel supply system 74 for the engine 50 is installed below the intake device 70. The fuel supply system 74 is provided with injectors 75a, 75b for injecting fuel to an intake passage in the throttle body 72, and a fuel pump 76 for supplying the fuel to the injectors 75a, 75b.

Fuel in the front tanks 41, 42 and the rear tank 43 are integrally sucked into the fuel pump 76, and delivered from the fuel pump 76 to the injectors 75a, 75b.

The fuel pump 76 is formed into a cylindrical shape, and is arranged to be inclined forward above the rear portion of the crankcase 52 and in front of the rear suspension unit 26.

The rear frame 14 is provided with an electric component storage portion 77 formed behind the air cleaner 71. An ECU 78 being a control part for the motorcycle 1, and a battery 79 are stored in the electric component storage portion 77. The lower portion of the rear frame 14 is attached with a mudguard 80 extending downward to the front side of the rear wheel 3.

Figure 6:
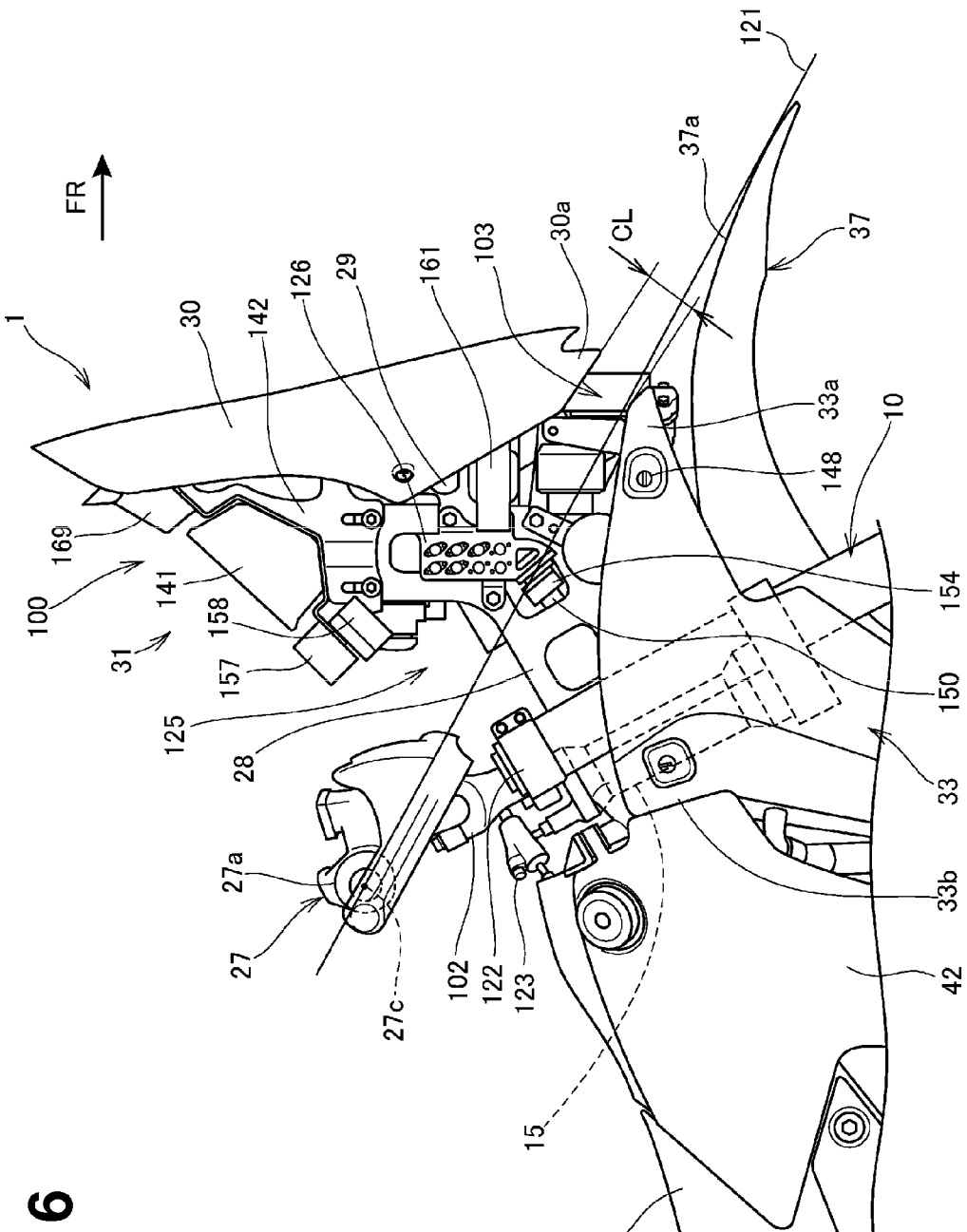
FIG. 6 is a right side view of a main section showing a front portion of a vehicle body of the motorcycle.

FIG. 6 is a right side view of a main section showing a front portion of the vehicle body of the motorcycle 1. The head pipe 15 is attached with a vehicle body front unit 100 with the headlight 29, the windscreen 30, the gauges 31, other electric components and the like supported.

The vehicle body front unit 100 is provided with the front stay 28, said front stay 28 being detachably mounted to the front portion of the head pipe 15 by a plurality of bolts. Components are attached to the front stay 28 directly or through a plurality of stays.

The transparent windscreen 30 covers the gauges 31 or the like at a position separated and forward from the handlebar 27. The vertical center of the windscreen 30 is positioned at substantially the same height as grips 27a, 27b (only the grip 27a on the near side is shown) of the handlebar 27 with the front wheel 2 (see FIG. 1) directed straight-ahead.

The cowls 33 are configured such that portions in the vicinity of tip ends 33a are detachably mounted to the lower portion of the vehicle body front unit 100 and portions in the vicinity of rear ends 33b of the upper portions are detachably mounted to the front tanks 41, 42 (only the front tank 42 on the near side is shown) through the stay.

The right and left cowls 33 are respectively arranged at a position below a supporting member 102 for the handlebar 27 provided on the upper portion of the front fork 10, and the tip ends 33a of the cowls 33 are vertically separated from the lower end 30a of the windscreen 30. A reference sign 103 refers to a clearance between the tip ends 33a of the cowls 33 and the lower end 30a of the windscreen 30, and a reference sign CL refers to a length of the clearance.

In the side view, when a straight line 121 in contact with an upper surface 37a of the front fender 37 is drawn from an axis 27c of each of the grips 27a, 27b of the handlebar 27, the cowls 33 are arranged below the straight line 121.

The supporting member 102 for the handlebar 27 is fixed on the upper portion of a top bridge 122 for coupling the right side and the left side of the front fork 10 to each other. A steering damper 123 for moderating sudden turning of the handlebar 27 caused by external force is disposed between the top bridge 122 and the main frame 16 (see FIG. 2).

In the side view, a lateral side of a space 125 surrounded by the handlebar 27, the windscreen 30 and the cowls 33 is opened, and an electric component connection 126 attached to a right side of the front stay 28 is exposed upward and to the lateral side. Therefore, a main harness connection terminal 154, a connection connector (not shown) for the respective electric components and the like can be easily connected to and detached from the electric component connection 126. Also, a bolt fixing the front stay 28 to the head pipe 15 may be loosened, a main harness connecting connector 127 may be detached from the electric component connection 126, and in addition, some electric component harnesses connected to the electric component connection 126 may be removed. Thereby, the vehicle body front unit 100 can be easily detached from the vehicle body.

Figure 7:
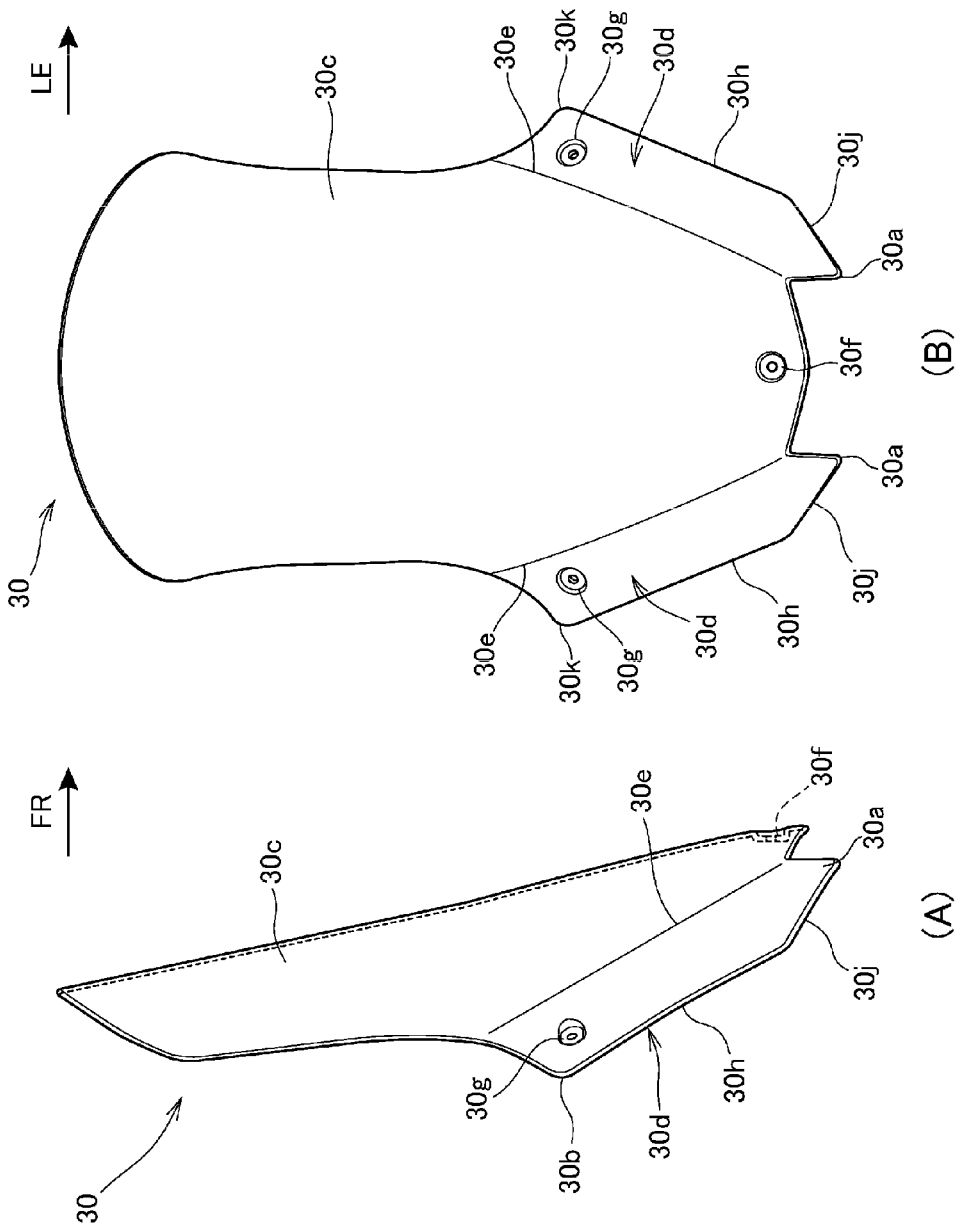
FIG. 7(A) is a right side view of a windscreen which is a component of the motorcycle of FIGS. 1-2.
FIG. 7(B) is a front view of the windscreen.

FIG. 7 is an illustration diagram showing a shape of the windscreen 30 consisting of FIGS. 7(A) and 7(B). FIG. 7(A) is a right side view of the windscreen 30, and FIG. 7(B) is a front view of the windscreen 30.

As shown in FIG. 7(A), the windscreen 30 is formed into a curved shape with the center in the vehicle width direction projecting forward, and is provided with rear ends 30b, 30b (only the rear end 30b on the near side is shown) that project in a backmost direction in substantially the center in a height direction.

As shown in FIG. 7(B), the windscreen 30 is composed of a vertically long portion 30c that is formed into a vertically long circular arc shape having an upwardly projecting upper edge and that has a shape with a lower portion narrowing toward the bottom, and lateral extension portions 30d, 30d that integrally extend in the vehicle width direction from the lower portion of the vertically long portion 30c to each lateral side respectively.

Trough lines 30e, 30e are formed at a boundary between a front surface of the vertically long portion 30c and front surfaces of the lateral extension portions 30d, 30d. The lateral extension portions 30d, 30d extend outwardly in the vehicle width direction beyond the side portions of the vertically long portion 30c. Due to the expansion portions 30d, 30d, it becomes possible to keep a side of the rider, and in particular, the rider's hands gripping the handlebar 27, (see FIG. 6) shielded from the traveling wind.

The lower ends 30a, 30a of the lateral extension portions 30d, 30d are respectively included in the lateral extension portions 30d, 30d. Side ends 30k, 30k, positioned on the outermost sides of the lateral extension portions 30d, 30d are matched with the above-mentioned rear ends 30b (see FIG. 7(A)). A lower portion in the center in the vehicle width direction of the vertically long portion 30c and the upper portions of the lateral extension portions 30d, 30d are provided with mounting portions 30f, 30g, 30g for fixing the windscreen 30 to the vehicle body front unit 100 (see FIG. 6).

In FIGS. 7(A) and (B), as will be described in more detail below, side edges 30h, 30h and lower edges 30j, 30j of the lateral extension portions 30d, 30d are formed at an angle in consideration of a line of sight of the rider.

Figure 8:
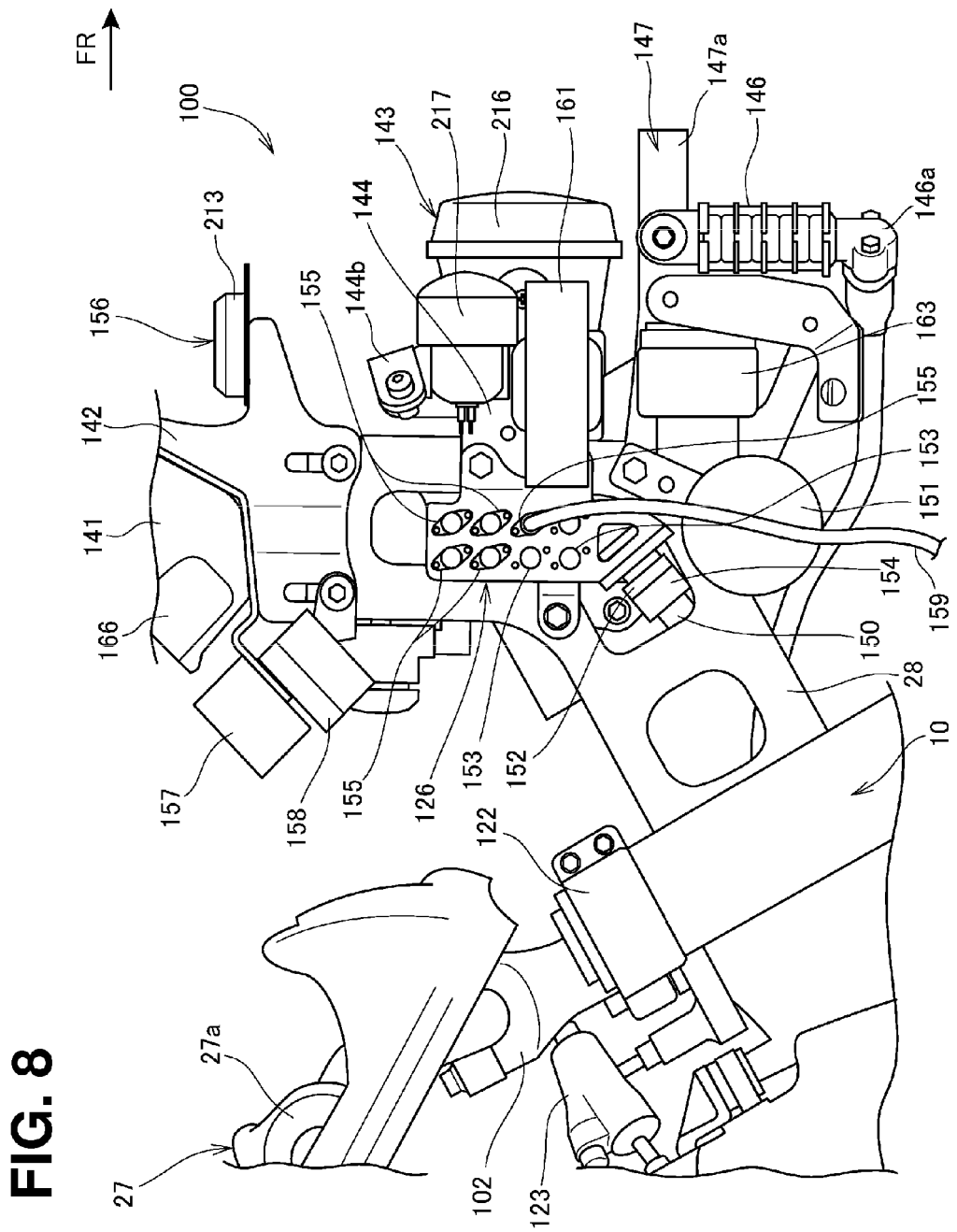
FIG. 8 is a right side view showing a main section of a vehicle body front unit.

FIG. 8 is a right side view showing a main section of the vehicle body front unit 100 and shows the state in which the windscreen 30 (see FIG. 6) is detached. The front stay 28 is attached with a navigation guide holder stay 142 for supporting a navigation guide holder 141, a headlight stay 144 for supporting a headlight 143, and an oil cooler stay 147 for supporting an oil cooler 146.

The navigation guide holder 141 is a device configured such that a navigation guide including a plurality of maps with, for example, indications of the distance from a starting point of a race can be held, and also pages can be turned as needed.

The electric component connection 126 and a horn 151 are directly attached to the lateral surface of the front stay 28. The electric component connection 126 is provided with a main harness receiving connector 152 and a plurality of electric component receiving connectors 153. The main harness receiving connector 152 is provided to a lower end surface of the electric component connection 126, and is connected with the main harness connection terminal 154 provided at the end of the main harness 150. The plurality of electric component receiving connectors 153 are provided to the lateral surface of the electric component connection 126.

The plurality of electric component receiving connectors 153 are connected with, for example, the navigation guide holder 141, the headlight 143, the horn 151, a fuse box 158, a dimmer switch 171 (see FIG. 9), and a connection terminal 155 provided at an end of a harness 159 (only one harness 159 is shown) that extends from a vehicle speed sensor for the front wheel or the like, as the electric components arranged in the vehicle body front unit 100.

In addition, the navigation guide holder stay 142 provides support for a transmitting and receiving GPS antenna 156, an auxiliary trip meter 157, and the fuse box 158, which are attached thereto. The auxiliary trip meter 157 is used supplementary to the a main trip meter 167 as will hereinafter be described or used as a backup when the main trip meter 167 is inoperative, and can display a vehicle speed thereon.

In addition, the headlight stay 144 provides support for a camera 161 for taking a picture of the front side of the vehicle body during traveling, and the windscreen 30 which are attached thereto (see FIG. 6). Further, the oil cooler stay 147 provides support for a buzzer 163 and the windscreen 30, which are attached thereto. The buzzer 163 is, for example, a regulation component supplied by a promoter of the race, is manipulated by the promoter, and is sounded.

Figure 9:
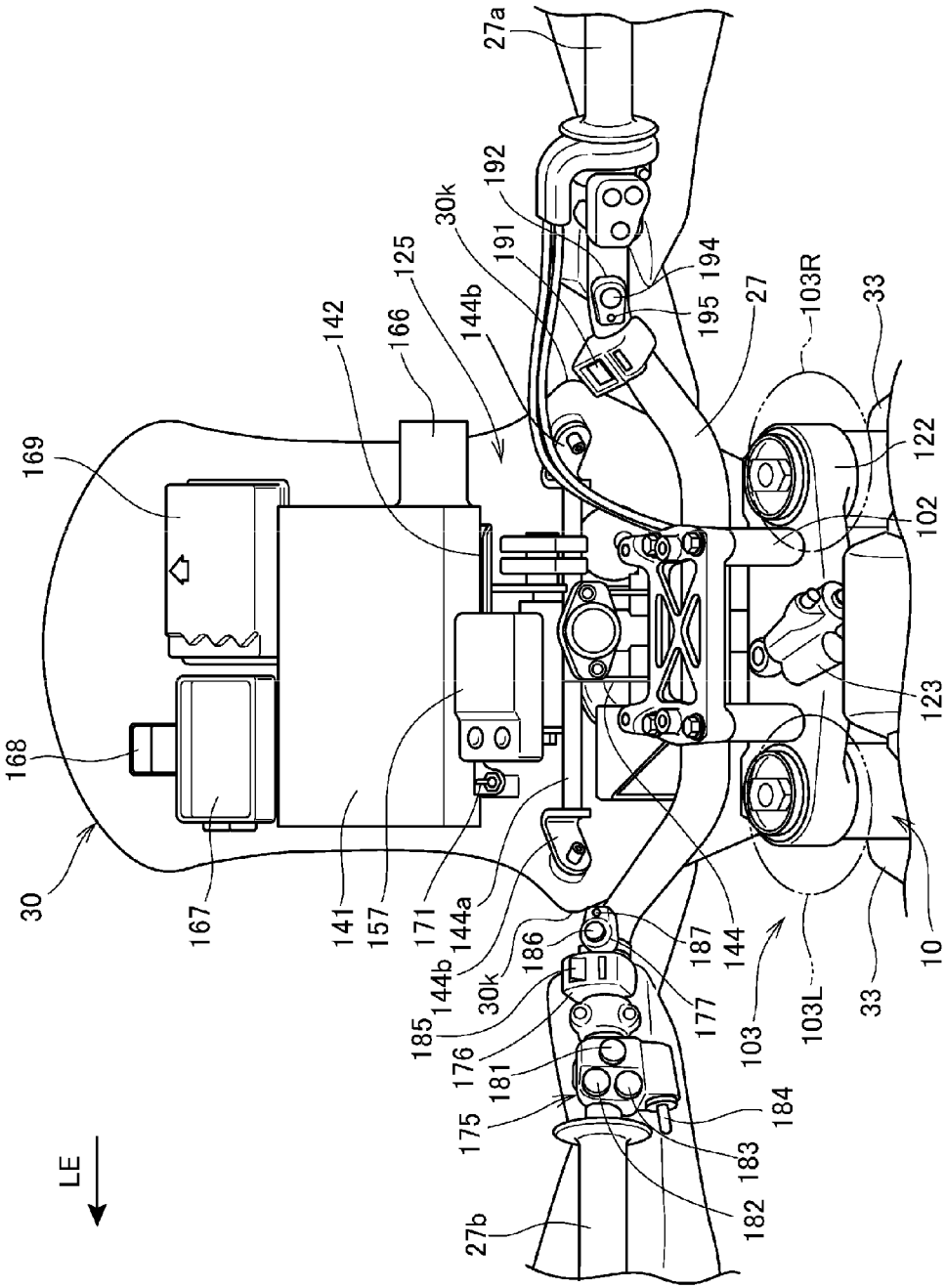
FIG. 9 is a rear view showing a main section of a front portion of the motorcycle.

FIG. 9 is a rear view showing a main section of a front portion of the motorcycle 1. The rider can visually recognize the road surface in front of, and on both lateral sides of the front wheel 2 (see FIG. 6) due to the clearance 103 between the windscreen 30 and the cowls 33, 33, and particularly, due to a left clearance 103L and a right clearance 103R, which form a part of the clearance 103. In particular, with the rider seated on the seat 12 (see FIG. 1) or with the rider standing on the right and left steps 39 (see FIG. 1), the rider visually recognizes an area around the front wheel 2 through the space 125 between the windscreen 30 and the handlebar 27, the left clearance 103L and the right clearance 103R.

The navigation guide holder 141 is provided with an actuator 166 on a lateral surface thereof for operating the navigation guide. The main trip meter 167 is arranged at the upper left of the navigation guide holder 141. Further, a remaining fuel gauge 168 is arranged on the main trip meter 167.

An information display unit 169 is arranged at the upper right of the navigation guide holder 141. The information display unit 169 displays thereon the vehicle speed, orientation (forward traveling direction), and a distance from the starting point that are obtained by the transmitting and receiving GPS antenna 156 (see FIG. 8).

The dimmer switch 171 is attached to a left lower end of the navigation guide holder stay 142 for allowing switching between a high beam and a low beam of the headlight 143 (see FIG. 8). The headlight stay 144 is provided with a screen supporting portion 144a extending in the vehicle width direction, and the right and left mounting portions 30g, 30g of the windscreen 30 (see FIG. 7(B)) are respectively attached to screen mounting portions 144b, 144b that are provided at both ends of the screen supporting portion 144a.

The handlebar 27 in the vicinity of the left grip 27b is attached with a multiple operating switch 175 for operating the navigation guide holder 141 and the main trip meter 167, an engine-operating switch 176 for operating the engine 50, and a horn switch 177 for operating the horn 151 (see FIG. 8).

The multiple operating switch 175 is provided with a mode-switching button 181 for the main trip meter 167, error adjustment buttons 182, 183 for the main trip meter 167, and an actuator activation switch 184 for activating the actuator 166 for the navigation guide holder 141 in order to operate the navigation guide. The mode-switching button 181 is a button for switching a display mode to a travel distance, a vehicle speed and a clock. The error adjustment buttons 182, 183 are buttons that adjust an error between a distance indicated on the road map and a distance displayed on the main trip meter 167 by lengthening or shortening the distance displayed on the main trip meter 167.

The engine-operating switch 176 is provided with a map-switching button 185 for switching a control map stored in a memory of the ECU (Engine Control Unit) in order to control the engine 50. The horn switch 177 is provided with a headlight indicator 187 in the vicinity of the horn button 186, the headlight indicator 187 being configured to turn on an indicator light when the headlight 143 (see FIG. 8) is set to the high beam.

The handlebar 27 in the vicinity of the right grip 27a is attached with a main switch 191 and a starter switch 192. The starter switch 192 is provided with a starter button 194, and an FI indicator 195 that informs the rider of abnormality of a fuel injection system of the engine 50 and a voltage reduction in the battery by illuminating a lamp.

Next, the function of the above-mentioned windscreen 30 and cowls 33 will be described.

Figure 10:
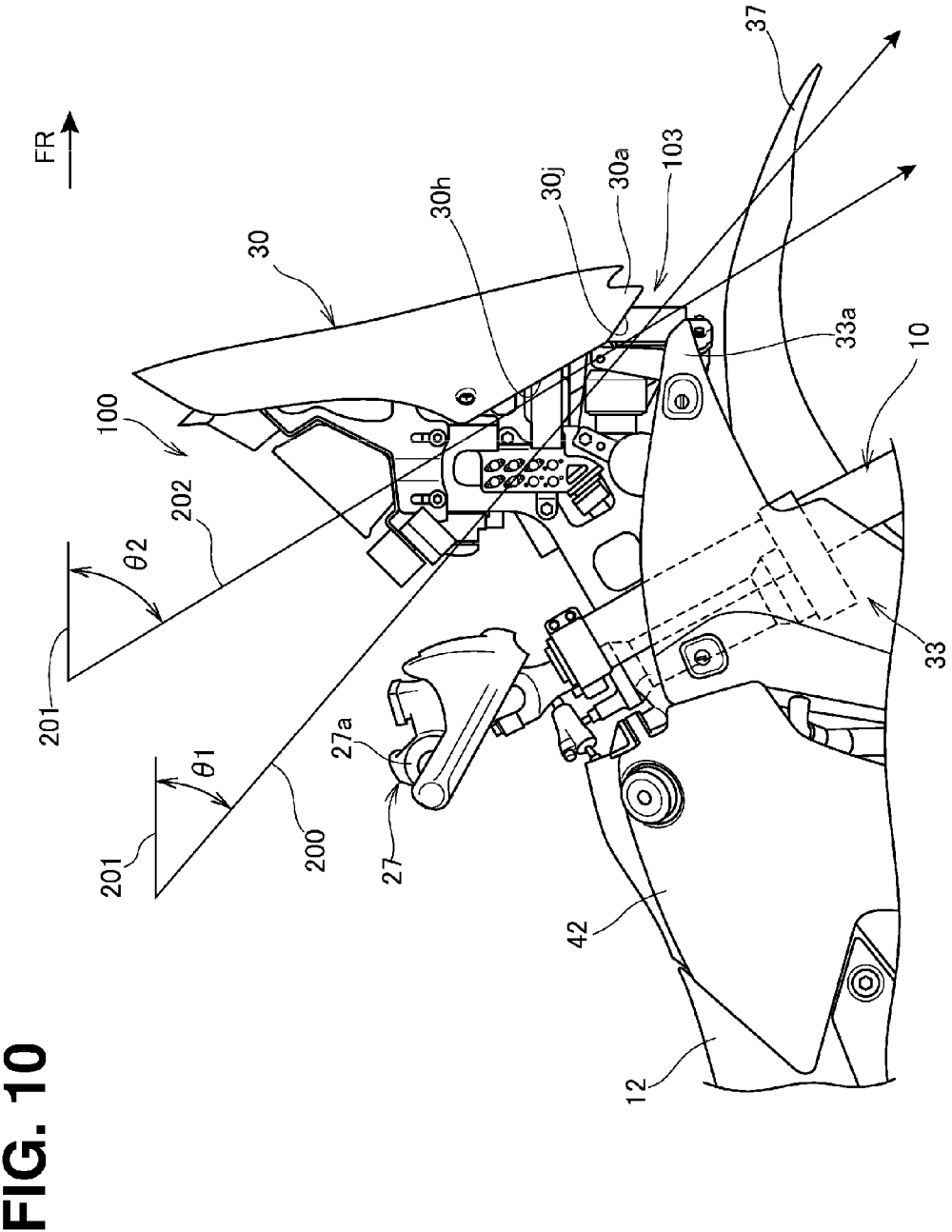
FIG. 10 is a function diagram showing the function of a clearance between the windscreen and a cowl.

FIG. 10 is a function diagram showing the function of the clearance 103 between the windscreen 30 and the cowls 33. During traveling or stopping of the vehicle, the rider can see the road surface around the front wheel 2 through the clearance 103 between the windscreen 30 and the right and left cowls 33 with the rider seated on the seat 12. In the seated position, the line of sight 200 of the rider is set to be declining at an angle θ1 from a horizontal line 201. The right and left lower edges 30j of the windscreen 30 are formed along the line of sight 200 in the side view.

Also, the rider can see the road surface around the front wheel 2 through the clearance 103 with the rider standing on the steps. In the standing position, a line of sight 202 of the rider is set at a declining angle θ2 from the horizontal line 201. The right and left side edges 30h of the windscreen 30 are formed along the line of sight 202 in the side view.

Therefore, in both the case where the rider is seated on the seat and the case where the rider stands on the steps, visibility with respect to the road surface can be further improved by increasing use of the clearance 103. This can be achieved through consideration of the driver line of sight in the disposition of the right and left side edges 30h and the right and left lower edges 30j of the windscreen 30. In this manner, a wider area of the road surface around the front wheel 2 can be seen through the clearance 103.

Figure 11:
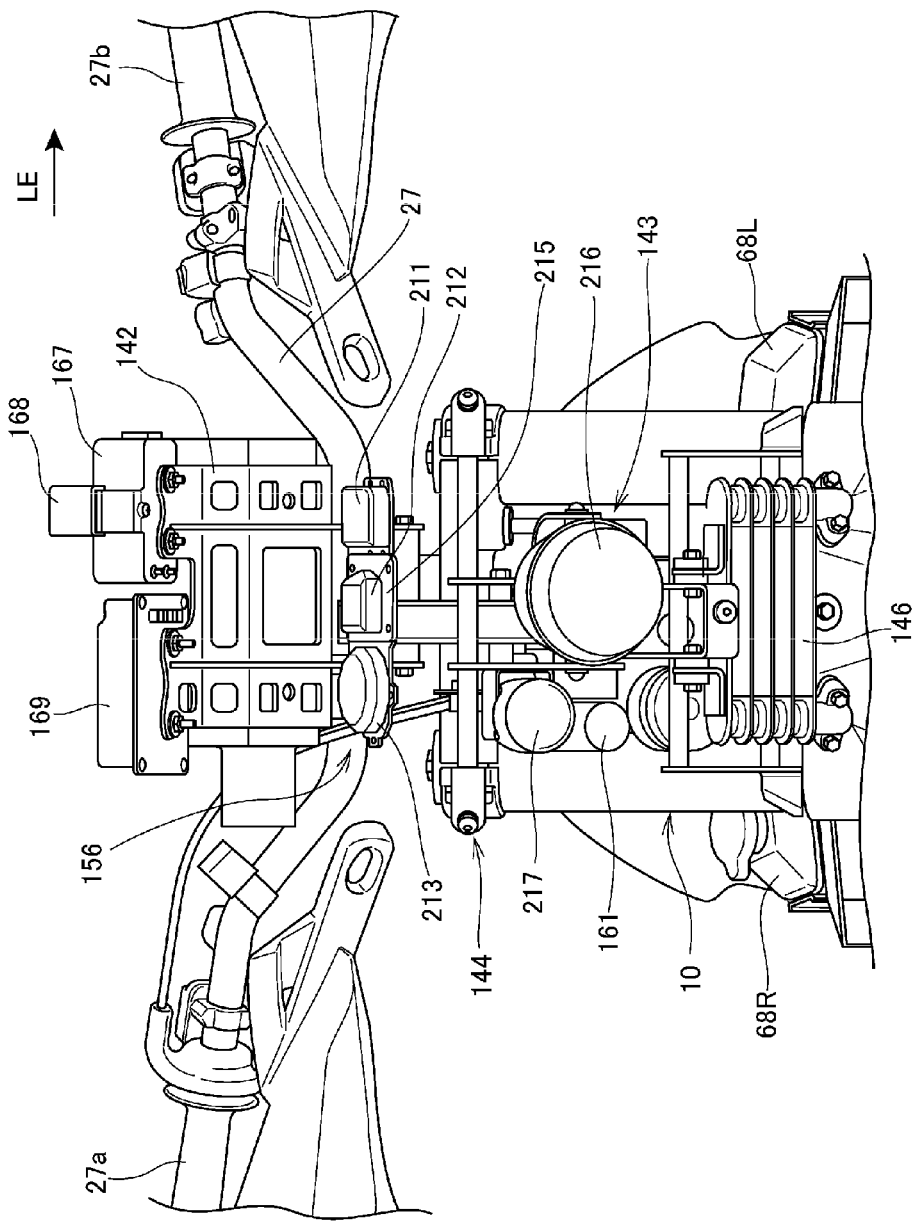
FIG. 11 is a front view of a main section of the motorcycle with the windscreen removed.

FIG. 11 is a front view of a main section of the motorcycle 1 with the windscreen 30 removed. The transmitting and receiving GPS antenna 156 is composed of a plurality of antenna components 211, 212, 213, said antenna components 211, 212, and 213 being attached to a pedestal portion 215 side by side in the vehicle width direction. The pedestal portion 215 is configured to be connected to and project forward from the navigation guide holder stay 142.

The headlight 143 is composed of a first light 216 incorporating an LED as a light source, and a second light 217 incorporating a bulb as a light source. The first light 216 is arranged in substantially the center in the vehicle width direction, the second light 217 is arranged obliquely upward on a right side of the first light 216, and the camera 161 is disposed below the second light 217. When the headlight 143 is set to the low beam, only the first light 216 is lighted, and when the headlight 143 is set to the high beam, both the first light 216 and the second light 217 are lighted.

Figure 12:
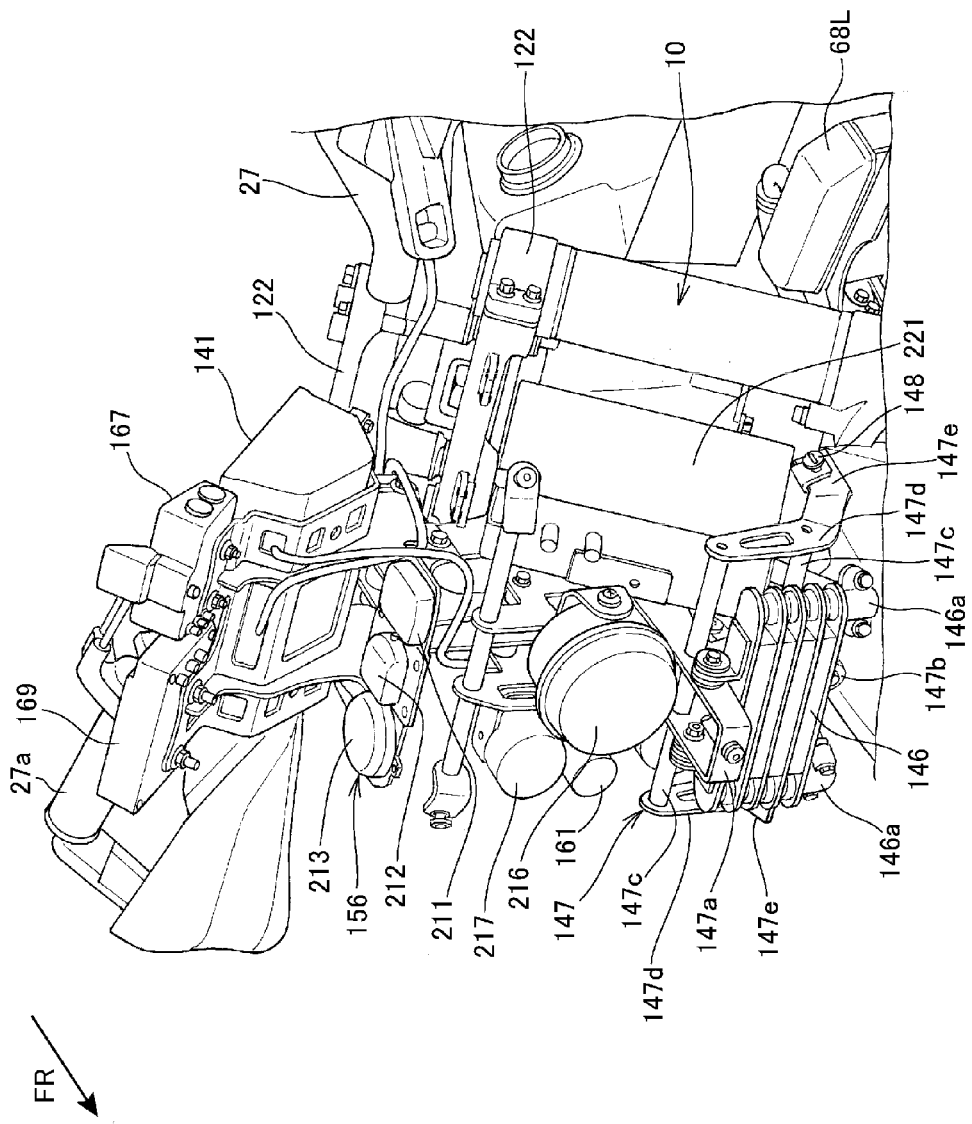
FIG. 12 is a perspective view showing a main section of the front portion of the motorcycle with the windscreen removed.

FIG. 12 is a perspective view showing a main section of a front portion of the motorcycle 1 with the windscreen 30 removed. The oil cooler stay 147 is provided with a pair of upper and lower forwardly projecting portions 147a, 147b, cross portions 147c, 147c, and end coupling portions 147d, 147d. The forwardly projecting portions 147a, 147a respectively project forward, and the cross portions 147c, 147c extend in the vehicle width direction from respective intermediate portions of the forwardly projecting portions 147a, 147b.

The end coupling portions 147d, 147d are provided with a pair of right and left cowl mounting portions 147e, 147e that couple ends of the cross portions 147c, 147c to each other and that are mounted with the tip ends 33a of the cowls 33 (see FIG. 6). Note that element 148 is a screw for fastening each of the tip ends 33a of the cowls 33 to the cowl mounting portions 147e. The forwardly projecting portions 147a, 147b are mounted with the oil cooler 146. Note that elements 146a, 146a are oil supplying/discharging hose mounting ports of the oil cooler 146.

For example, a regulation component (a distress signal transmitter) 221, which may be provided from the promoter of the race, is arranged behind the first light 216 of the headlight 143 and the oil cooler 146.

As shown in FIG. 6, the front structure for the motorcycle 1 as the saddle-ride type vehicle includes the transparent windscreen 30 that shields the front side the gauges 31, said gauges 31 being arranged forward of the handlebar 27. The front structure further includes the pair of right and left front cowls 33 that are arranged outside of the front fork 10 in the vehicle width direction and that extend in a straddling manner in front of and behind the front fork 10 in the side view.

In the front structure for the motorcycle 1, the cowls 33 are arranged below the supporting member 102 of the handlebar 27 and are separated from the windscreen 30 in the vertical direction. For this reason, by providing the clearance 103 between the windscreen 30 and the cowls 33 that are arranged in positions spaced away from the handlebar 27, the rider can easily look at the road surface just in front of the front wheel 2 through the clearance 103 while improving the maintainability of the gauges 31 or the like. The cowls 33 are formed smaller than the existing cowls, and the upper edges of the cowls 33 are arranged below the supporting member 102 of the handlebar 27. For this reason, the maintenance access from the lateral side of the vehicle body can be improved.

Also, the cowls 33 are arranged below the straight line 121 connecting the grips 27a, 27b of the handlebar 27 and the upper surface 37a of the front fender 37 in the side view. For this reason, the visibility of the rider with respect to the road surface directly in front of the front wheel 2 (see FIG. 1) can be improved.

Also, as shown in FIG. 6 and FIGS. 7(A) and (B), since the windscreen 30 is configured such that the center thereof in the height direction is formed at substantially the same height as the height of the handlebar 27 and the side ends 30k, 30k as the outermost ends are arranged in the center in the height direction, the center position of the windscreen 30 in the height direction is enlarged toward the outside to form the outermost ends. For this reason, it becomes possible to shield the rider's hands gripping the handlebar 27 from the traveling wind.

Also, as shown in FIG. 6 and FIG. 8, the right and left side ends 30k, 30k of the windscreen 30 are matched with the rear ends 30b, 30b as the backmost ends, and the electric component connection 126 as the connection for the main harness 150 is arranged above the cowls 33 and behind the rear end 30b of the windscreen 30. For this reason, the electric component connection 126 for connecting the main harness 150 is disposed in an area unobstructed by the windscreen 30 and the cowls 33, and the ease of connecting elements to the electric component connection 126 can be improved.

Also, as shown in FIGS. 2, 6, 8, 9 and 12, the front stay 28 is detachably supported by the front portion of the head pipe 15, the head pipe being a component of the Frame F. The plurality of electric components including the navigation guide holder 141, the headlight 143, the transmitting and receiving GPS antenna 156, the auxiliary trip meter 157, the fuse box 158, the camera 161, the buzzer 163, the actuator 166, the main trip meter 167, the remaining fuel gauge 168, the information display unit 169, and the regulation component 221 are supported by the front stay 28, and the harness 159 (only one harness 159 is shown) for all the electric components 141, 143, 156, 157, 158, 161, 163, 166, 167, 168, 169, 221 supported by the front stay 28 is coupled to the main harness 150. For this reason, when one main harness connection terminal 154 is removed, wiring of all the electric components supported by the front stay 28 can be removed, and working efficiency when the front stay 28 is detached from the vehicle body frame F is improved.

Also, as shown in FIGS. 6 and 8, since the front stay 28 in front of the front fork 10 supports the cowls 33, the deflection and vibration of the cowls 33, for example of the tip ends 33a, are not coupled to the windscreen 30, and can be suppressed.

Although the present invention has been described herein with respect to a specific illustrative embodiment, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A front structure for a saddle-ride type vehicle comprising:
    a transparent windscreen that covers a front side of at least one gauge, said at least one gauge being arranged in front of a handlebar; and
    a front cowl that is arranged outside of a front fork in a vehicle width direction and that extends in a straddling manner in front of and behind the front fork in a side view;
    wherein the front cowl is arranged below a supporting member for the handlebar, and the front cowl is spaced away from the windscreen in a vertical direction;
    and wherein the outermost end of the windscreen corresponds to a backmost end of the windscreen, and a connection for a main harness is arranged above the front cowl and behind the backmost end of the windscreen.

2. The front structure for a saddle-ride type vehicle according to claim 1, wherein the front cowl is arranged below a straight line connecting one of a left and right grip of the handlebar, and an upper surface of a front fender in a side view, when the handlebar is in a position for the vehicle to move straight ahead.

3. The front structure for a saddle-ride type vehicle according to claim 1, wherein the windscreen is configured such that a vertical center of the windscreen is formed at a substantially same height as a height of the handlebar, and an outermost end of the windscreen is located vertically at a position corresponding to the vertical center of the windscreen.

4. The front structure for a saddle-ride type vehicle according to claim 2, wherein the windscreen is configured such that a vertical center of the windscreen is formed at a substantially same height as a height of the handlebar, and an outermost end of the windscreen is located vertically at a position corresponding to the vertical center of the windscreen.

5. The front structure for a saddle-ride type vehicle according to claim 4, wherein the outermost end of the windscreen corresponds to a backmost end of the windscreen, and a connection for a main harness is arranged above the front cowl and behind the backmost end of the windscreen.

6. A front structure for a saddle-ride type vehicle comprising:
   a transparent windscreen that covers a front side of at least one gauge, said at least one gauge being arranged in front of a handlebar; and
   a front cowl that is arranged outside of a front fork in a vehicle width direction and that extends in a straddling manner in front of and behind the front fork in a side view;
wherein the front cowl is arranged below a supporting member for the handlebar, and the front cowl is spaced away from the windscreen in a vertical direction,
   wherein:
      a stay is detachably supported by a front portion of a head pipe composing a body frame,
      a plurality of electric components is detachably supported by the stay, and
      a harness for all of the electric components supported by the stay is coupled to a main harness.

7. The front structure for a saddle-ride type vehicle according to claim 5, wherein a stay is detachably supported by a front portion of a head pipe composing a body frame,
   a plurality of electric components is detachably supported by the stay, and
   a harness for the plurality of electric components supported by the stay is coupled to the main harness.

8. The front structure for a saddle-ride type vehicle according to claim 6, wherein the cowl is connected to and supported by the stay at a position in front of the front fork.

9. The front structure for a saddle-ride type vehicle according to claim 7, wherein the cowl is connected to and supported by the stay at a position in front of the front fork.

10. A saddle-ride type vehicle comprising:
    a vehicle frame having a head pipe at a front end,
    a front fork for supporting a front wheel, said front fork being steerably supported by the head pipe,
    a steering handlebar fixed to an upper end of the front fork,
    a stay projecting forward from a front portion of the head pipe,
    at least one gauge supported by the stay,
    and a front structure, said front structure comprising:
        a transparent windscreen that covers a front side of the at least one gauge, said at least one gauge being arranged in front of said handlebar, and
        a front cowl that is arranged outside of a front fork in a vehicle width direction and that extends in a straddling manner in front of and behind the front fork in a side view,
    wherein the front cowl is arranged below the upper end of the front fork, and the front cowl is separated from the windscreen in a vertical direction,
    and wherein the outermost end of the windscreen corresponds to a backmost end of the windscreen, and a connection for a main harness is arranged above the front cowl and behind the backmost end of the windscreen.

11. The saddle-ride type vehicle according to claim 10, further comprising a front fender suspended from the front forks, wherein:
    the handlebar comprises a left grip and a right grip, and
    the front cowl is arranged below a straight line connecting one of the left grip and the right grip, and an upper surface of the front fender in a side view, when the handlebar is in a position for the vehicle to move straight ahead.

12. The saddle-type vehicle according to claim 10, wherein the windscreen is configured such that a vertical center of the windscreen is formed at a substantially same height as a height of the handlebar, and an outermost end of the windscreen is located vertically at a position corresponding to the vertical center of the windscreen.

13. A saddle-ride type vehicle comprising:
    a vehicle frame having a head pipe at a front end,
    a front fork for supporting a front wheel, said front fork being steerably supported by the head pipe,
    a steering handlebar fixed to an upper end of the front fork,
    a stay projecting forward from a front portion of the head pipe,
    at least one gauge supported by the stay,
    and a front structure, said front structure comprising:
        a transparent windscreen that covers a front side of the at least one gauge, said at least one gauge being arranged in front of said handlebar, and
        a front cowl that is arranged outside of a front fork in a vehicle width direction and that extends in a straddling manner in front of and behind the front fork in a side view, wherein:
    the front cowl is arranged below the upper end of the front fork, and the front cowl is separated from the windscreen in a vertical direction,
    the stay is detachably supported by the front portion of the head pipe,
    a plurality of electric components is detachably supported by the stay, and
    a harness for the plurality of electric components supported by the stay is coupled to a main harness.

14. The saddle-ride type vehicle according to claim 10, wherein the cowl is connected to and supported by the stay at a position in front of the front fork.

* * * * *